May 2, 1939.  E. C. LUCAS ET AL  2,156,860
ELECTRIC BROILER
Filed Sept. 13, 1937  2 Sheets-Sheet 1

Inventors
Ernest C. Lucas and
Anastasios T. Pappas

James P. Burns
Attorney

May 2, 1939.  E. C. LUCAS ET AL  2,156,860
ELECTRIC BROILER
Filed Sept. 13, 1937  2 Sheets-Sheet 2
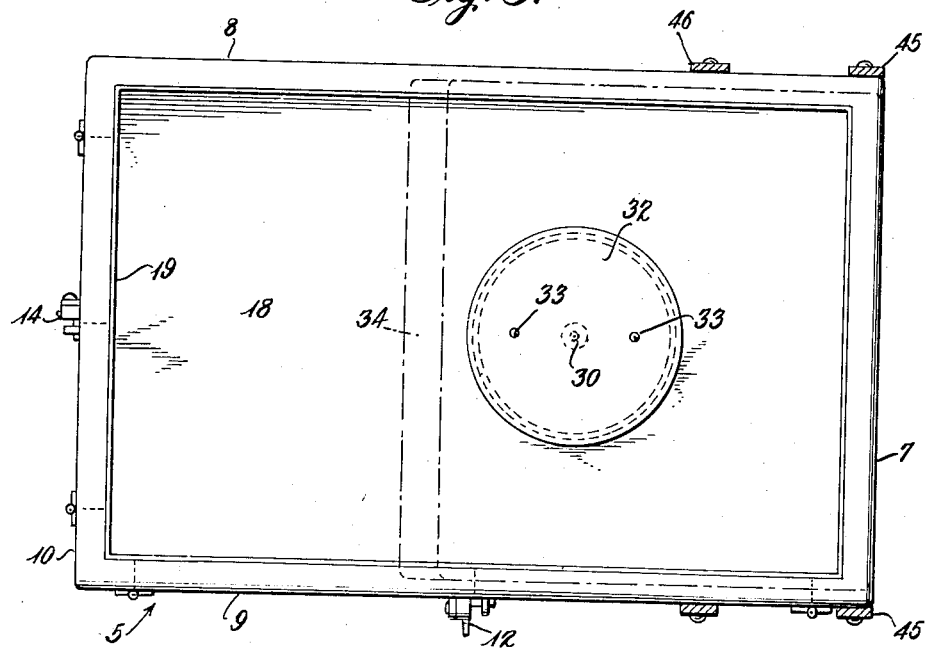
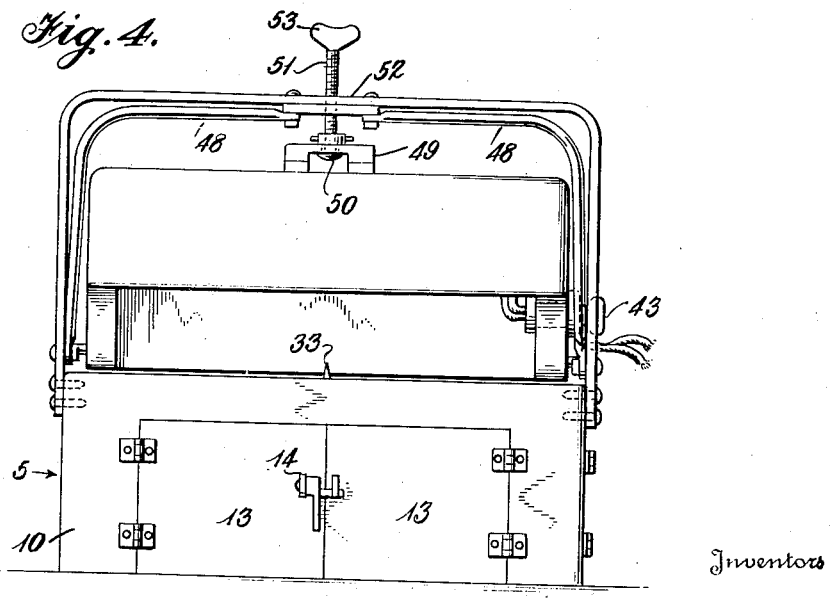
Inventors
Ernest C. Lucas and
Anastasios T. Pappas
By James P. Burns
Attorney Patented May 2, 1939

2,156,860

UNITED STATES PATENT OFFICE 2,156,860

ELECTRIC BROILER

Ernest C. Lucas and Anastasios T. Pappas, Columbus, Ohio

Application September 13, 1937, Serial No. 163,684

4 Claims. (Cl. 53—5)

This invention relates to new and useful improvements in electric broilers.

The primary object of the invention is to provide a device by means of which meat, fowl, and other foods may be broiled in a way to retain their natural flavors and juices and to obtain uniform quality.

A further object of the invention is to provide an electric broiler which is especially suitable for cooking roasts or fowl in restaurants, or the like, and at a location where the procedure may be kept in constant view of customers because of the pleasing and appetizing appearance it presents.

A further object of the invention is to provide an electric broiler which may be employed for slowly turning roasts of meat, or the like, while initially cooking the same and for subsequently maintaining the cooked roast heated in readiness for use and which broiler will permit servings to be cut from the roast during its slow turning movement while being kept hot.

Further objects and advantages of the invention will be apparent during the course of the following description.

Figure 1:
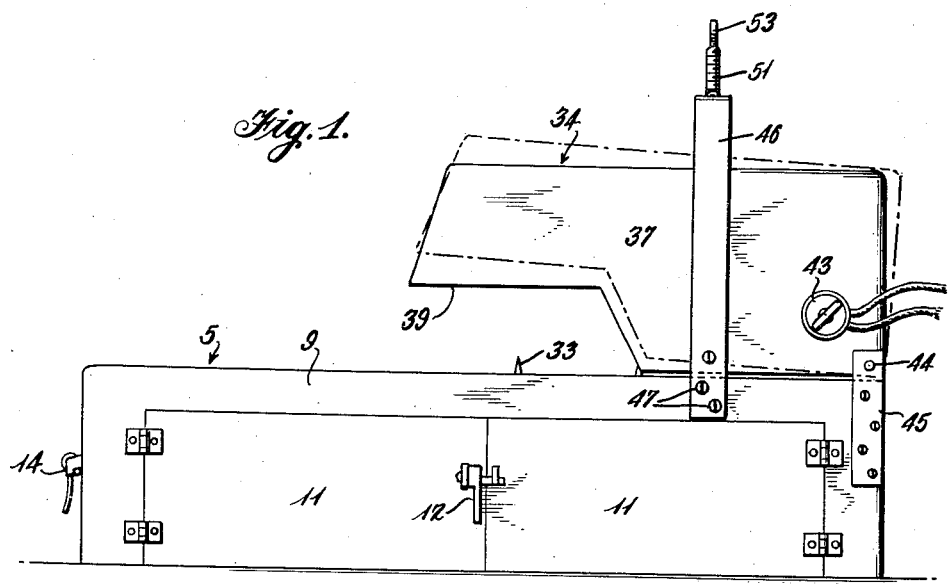
Figure 2:
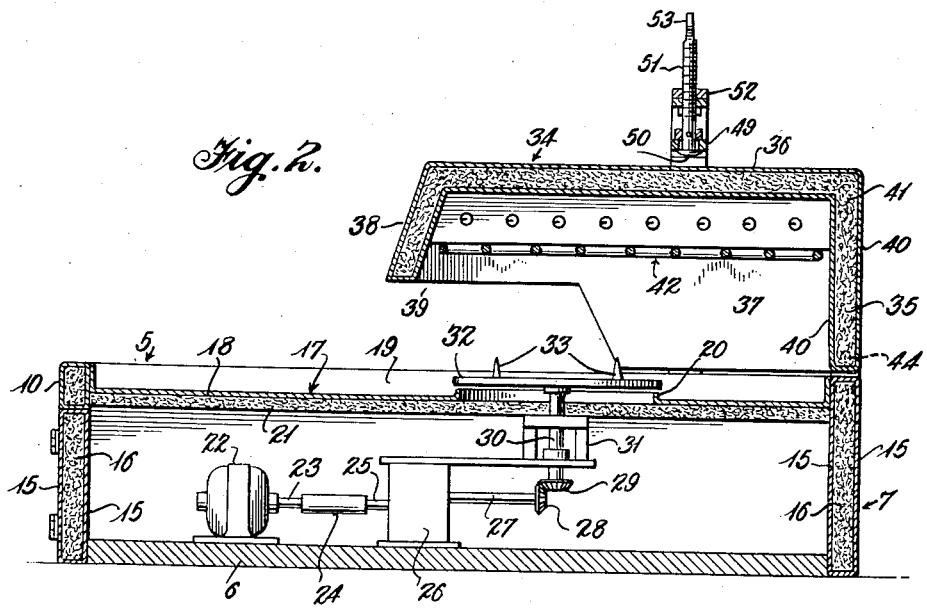

In the accompanying drawings forming a part of this specification and in which like numerals are employed to designate like parts throughout the same, Figure 1 is a side elevational view of the electric broiler device embodying this invention, Figure 2 is a front to back longitudinal vertical sectional view of the electric broiler disclosed in Fig. 1, Figure 3 is a top plan view of the housing which forms the main body portion of the electric broiler device disclosed in Figs. 1 and 2, and Figure 4 is a front elevational view of the said electric broiler.

In the drawings, wherein for the purpose of illustration is shown the preferred embodiment of this invention, the reference character 5 designates in its entirety the main body portion or housing of the electric broiler. This housing includes a bottom wall or base 6 to the marginal edges of which are secured the rear wall 7, the side walls 8 and 9, and the front wall 10. The major portion of the side wall 9 is formed by the two doors 11 which are hinged to the remainder of the side wall for outward opening movement and which are maintained in their closed position by means of the latch 12. The front wall 10 also is formed in part by doors 13 which are hinged to the remainder of this wall for outward opening movement and are retained in closed positions by means of the latch 14. These various walls 7 to 10, inclusive, and the doors 11 and 13 are formed of a skin or shell 15, constructed of monel metal, stainless steel, or the like. A comparatively heavy ply or layer 16 of insulating material is enclosed by the skin or shell 15. This construction provides rear, front and side walls which are properly insulated to prevent overheating or injury to any mechanism positioned within the housing.

Figs. 2 and 3 of the drawings disclose the top wall 17 of the housing as being formed of a sheet 18 of monel metal, stainless steel, or the like, which is flanged at its margins 19 for being welded, or secured in any other desired manner, to the inner surfaces of the various side, rear and front walls. The marginal flanges 19 of this top wall places the main body portion of the same below the top edges of the side, rear and front walls, or, in effect, forms a basin for accumulating and holding juices which may run from the object being broiled. An upturned flange 20 is formed in the sheet 17 for surrounding an opening formed in the said sheet to accommodate a drive shaft which passes through the top wall and which will be described at a later point. This upturned flange 20 prevents leakage of the said food juices through the opening which accommodates the drive shaft. The plate 18 is provided with a ply or layer 21 formed of insulating material and functioning to prevent downward passage of heat through the top wall into the interior of the housing.

Mounted on the bottom wall or base 6 of the housing and located within the latter is an electric motor 22 which may be supplied with electricity and controlled with reference to its periods of operation by any suitable mechanism, not shown. The armature shaft 23 of the motor is connected by means of a coupling 24 to the drive shaft 25 of a speed reduction gear unit 26 which has a driven shaft 27 projecting therefrom. A bevel gear 28 is suitably keyed to the shaft 27 and constantly meshes with a bevel gear 29 keyed to the perpendicularly extending shaft 30. This perpendicular shaft is journaled in a suitable bearing structure 31 which supports the shaft 30 in a manner to permit its upper end to project through a suitable aperture formed in the insulating layer 21 of the top wall 17 and concentrically through the opening formed in the top plate 18 by the flange 20. This perpendicular shaft 30 functions as a drive shaft for the turntable 32 located within the basin formed by the top wall of the housing. The diameter of this turntable 32 is greater than the diameter of the opening formed by the flange 20 so that any juices running off of the margin of the turntable will be certain to drop onto the top wall plate 18. Pointed spikes, or the like, 33, project upwardly from the top surface of the turntable 32 and function to secure a roast of meat, a fowl, or the like, onto the turntable.

Due to the reduction in speed produced by the gear unit 26, the turntable drive shaft 30 is intended to make but one revolution per minute with the result that servings may be cut from the roast, or the like, secured to the turntable while the latter is slowly rotating.

A heat reflecting hood, designated in its entirety by the reference character 34, is mounted on the housing and is shaped to overlie and substantially enclose the turntable 32 and the object mounted thereon. This hood 34 is formed of a rear wall 35, a top wall 36, side walls 37 and a front wall 38. The side wall 37 and the front wall 38 are partially cut away, or reduced in height, as at 39, in the vicinity of the turntable for the purpose of rendering the turntable and the object mounted thereon accessible to an attendant to permit servings to be severed from the said object while the turntable is rotating slowly.

The various walls of this hood are formed of a skin or shell 40 which may be monel metal, stainless steel, or the like, and a comparatively heavy layer or ply of insulating material 41. This hood, therefore, functions to prevent the escape of heat from beneath the same and to reflect heat generated within the hood downwardly onto the object positioned on the turntable for accomplishing cooking of the said object or for maintaining the previously cooked object in a heated condition ready to be served.

An electric heater element 42 is suitably mounted within the hood 34 and is controlled by means of the electric switch 43 mounted on the exterior of the hood. This switch, of course, may be of a multiple pole multiple throw type for the purpose of throwing into and out of circuit certain portions of the heating element 32 to provide different degrees of heat.

It is deemed desirable to be able to adjust the hood 34 toward and from the turntable 32. This adjustment is accomplished in the following manner. The rear portion of the hood is mounted on a transversely extending bar 44 which is pivotally journaled in the straps or brackets 45 secured to the rear edge portion of the side walls 8 and 9. Figs. 1 to 3, inclusive, disclose an inverted, substantially U-shaped supporting bracket 46 which is secured at the lower ends of its arms or sides to the upper portions of the side walls 8 and 9 by means of the securing members 47. This inverted U-shaped supporting bracket is positioned substantially midway of the length of the hood 34. To reinforce the bracket, angle braces 48 are secured to and positioned inside of the opposite sides of the bracket 46.

A strap or yoke 49 is secured to the upper portion of the hood 34. This strap has rotatably journaled in an aperture formed in the same, the lower end 50 of an adjusting screw 51 which is threaded in the intermediate portion 52 of the supporting bracket 46. A wing handle or grip 53 is formed on the upper end of the adjusting screw 51. It will be appreciated that the portion of the screw 51 which is rotatably connected to the yoke or strap 49 is loosely connected thereto to permit the screw to partake of pivotal movement relative to the said strap or yoke to accommodate swinging movement of the hood around its pivot rod 44.

By adjusting the hood 34 upwardly and downwardly with respect to the turntable 32 and by varying the heating action of the element 42, a wide range of different degrees of heat may be applied to the object being cooked or heated on the turntable 32.

It is to be understood that the form of this invention herewith shown and described is to be taken as a preferred example of the same, and that various changes in the shape, size, and arrangement of parts may be resorted to without departing from the spirit of the invention or the scope of the subjoined claims.

Having thus described the invention, we claim:

1. In an electric broiler of the type described, a housing, a power transmission drive located in the housing and including a slowly rotating drive shaft projecting through the top wall thereof, a turntable mounted on the projecting end of said shaft and adapted to support and hold a roast of meat, or the like, an open bottomed heat reflecting hood mounted on said housing to overlie and partially enclose the turntable, said hood having its side walls in the vicinity of the turntable and its front wall partially cut away to permit an attendant to have access to the object on said turntable to cut a serving therefrom, means for vertically adjusting the hood relative to said turntable to vary the heat reflecting action of the same, an electric heater element mounted in said hood for initially cooking and/or subsequently maintaining heated the object held by said turntable.

2. In an electric broiler of the type described, a housing, a power transmission drive located in the housing and including a slowly rotating drive shaft projecting through the top wall thereof, a turntable mounted on the projecting end of said shaft and adapted to support and hold a roast of meat, or the like, an open bottomed heat reflecting hood mounted on said housing to overlie and partially enclose said turntable, a pivotal connection between the rear portion of said hood and said housing, a supporting bracket attached to said housing and extending over said hood, an adjusting screw rotatably connected to the hood and threadedly connected to said bracket, whereby rotation of said screw will effect pivotal adjustment of said hood, and an electric heater element mounted in said hood for initially cooking and subsequently maintaining heated the object held by said turntable.

3. In an electric broiler of the type described, a supporting base, a heating element, an open bottomed hood one end of which is pivotally connected to said base, a bracket of substantially inverted U-shape attached to said base and overlying said hood, and adjustable means connecting said hood to said bracket whereby adjustment of said means will effect pivotal adjustment of said hood with respect to said base.

4. In an electric broiler of the type described, a housing having mounted thereon a support for the article to be broiled, an open bottomed reflecting hood pivotally connected to said housing and overlying said support, a heating element, a bracket attached to said housing and extending over said hood, and an adjusting screw connecting said hood to said bracket.

ERNEST C. LUCAS.
ANASTASIOS T. PAPPAS.